United States Patent [19]

Takamura et al.

[11] 4,190,555

[45] Feb. 26, 1980

[54] CATALYST SYSTEM FOR POLYMERIZING ALPHA-OLEFINS AND METHOD OF MAKING SAME

[75] Inventors: Yoshinori Takamura, Otake; Hakusei Hamada, Nerima; Kiyoyuki Kitamura, Otake; Tetsuro Inada, Otake; Kunio Kodama, Otake; Katuyuki Usami, Otake, all of Japan

[73] Assignee: Mitsui Toatsu Chemicals, Incorporated, Tokyo, Japan

[21] Appl. No.: 762,843

[22] Filed: Jan. 27, 1977

[30] Foreign Application Priority Data

Feb. 5, 1976 [JP] Japan ................... 51-10805

[51] Int. Cl.$^2$ .............................................. C08F 4/64
[52] U.S. Cl. ............................ 252/429 B; 252/429 C; 526/142; 526/143
[58] Field of Search ................. 252/429 B, 441, 429 C

[56] References Cited

U.S. PATENT DOCUMENTS

| | | | |
|---|---|---|---|
| 3,492,281 | 1/1970 | Smith et al. | 252/429 B X |
| 3,769,233 | 10/1973 | Hermans et al. | 252/429 C X |
| 3,984,350 | 10/1976 | Karayannis et al. | 252/429 B |

FOREIGN PATENT DOCUMENTS 39-20501  9/1964  Japan.
51-15187 12/1976  Japan.

OTHER PUBLICATIONS

Natta et al., Gazz. Chim. Ital., 89 (1959) pp. 2065-2075.
Smith et al., J. Polymer. Sci. Part A-I, vol. 7 (1969) pp. 707-713.

*Primary Examiner*—Patrick Garvin

[57] ABSTRACT

A method is disclosed for preparing a catalyst system for polymerizing α-olefins. This method comprises admixing with at least an organoaluminum compound an activated titanium component which is prepared by first reacting a titanium compound of the general formula, $TiX_n(OR)_{4-n}$ (in which X is a halogen atom, R is an alkyl group or a phenyl group, and n is 2 to 4), with a metal of Group II or III of the Periodic Table and a halide of a metal of Group II or III of the Periodic Table in the presence of an aromatic compound, then treating the resulting reaction product with an oxygen-containing organic compound, and further treating with a tetrahalide of titanium, vanadium or both at a temperature of from −80° C. to 80° C., and finally aging at a temperature above 30° C. for from 30 minutes to 24 hours.

19 Claims, No Drawings

CATALYST SYSTEM FOR POLYMERIZING ALPHA-OLEFINS AND METHOD OF MAKING SAME

FIELD OF THE INVENTION

This invention relates to a process for preparing a catalyst system for the polymerization or copolymerization of α-olefins (hereinlater referred to simply as polymerization of α-olefins) and also particularly, to a novel catalyst system for the polymerization of α-olefins which catalyst system comprises therein, besides an organoaluminum compound, an activated titanium component which is obtained as a result of novel high activation treatments. The invention further relates to the polymerization of α-olefins using said catalyst system.

DISCUSSION OF THE PRIOR ART

In the polymerization of α-olefins, it is known to use a catalyst system or a so-called Zeigler-Natta catalyst comprising a transition metal halide such as titanium trichloride or titanium tetrachloride, an organometallic compound such as an organoaluminum compound, and if desired, a third component. In the polymerization of α-olefins, particularly propylene, it is conventional to use a catalyst system composed of an activated titanium component using titanium trichloride or a titanium trichloride composition, and an organoaluminum compound. The activated titanium component using titanium trichloride or a titanium trichloride composition contained in the catalyst system (and hereinlater referred to simply as titanium trichloride) can be prepared by a number of known methods. For example, the activated titanium trichloride or component can be prepared by a method wherein titanium tetrachloride is reduced to titanium trichloride by means of hydrogen or a metal such as aluminum and is subjected to an activation treatment such as pulverizing, or is prepared by a method using a reduction of titanium tetrachloride by means of an organoaluminum compound, resulting in a solid mixture. However, the known method using the reduction of titanium tetrachloride to titanium trichloride by means of hydrogen or a metal such as aluminum, essentially requires an activation treatment step such as pulverizing, thus increasing the production cost of the catalyst. In addition, when the activated titanium trichloride obtained by this method is used in combination with an organometallic compound to polymerize α-olefins, the resulting α-olefin polymers have a very wide distribution of particle size and an undesirably large content of fines so that a slurry or powder of the polymers has very poor fluidity. This tends to cause troubles such as clogging of process apparatus in the industrial production of the α-olefin polymers. While the method for preparing titanium trichloride by the reduction of titanium tetrachloride with an organoaluminum compound does not necessarily need an activation treatment such as pulverizing, it nevertheless consumes a large amount of the organoaluminum compound, thus increasing very much the cost of production.

In addition to the problems mentioned above, it is important to note that, when the above-mentioned catalyst systems using the known activated titanium component are employed in the polymerization of α-olefins, particularly propylene, and in combination with an aluminum trialkyl compound as the organoaluminum compound, there is a tendency to produce large amounts of amorphous polymers, although achieving a satisfactory polymerization activity. Alternatively, when a dialkylaluminum monohalide is used instead of trialkylaluminum, the formation of amorphous polymers is reduced but the polymerization activity is disadvantageously lowered.

It is known from the Journal of Polymer Science (Part A-17, 701 (1969) and from U.S. Pat. No. 3,492,281 that a catalyst system comprising a mixture of beta-titanium trichloride and an organoaluminum is useful in the polymerization of isoprene, the brown beta-titanium trichloride in very pure form being prepared by reacting titanium tetrachloride, metallic aluminum and aluminum trichloride in an aromatic hydrocarbon to obtain a reaction product which is soluble in the aromatic hydrocarbon, treating the reaction product with an ether and then with additional titanium tetrachloride. This beta-titanium trichloride production process appears at a first sight similar in part to the activated tianium component produced by the present invention. However, in the above literature, there is found no description that such catalyst system is suitable for the polymerization of α-olefins. In fact, Applicants have found that, although the catalyst system using the beta-titanium trichloride is effective in the stereoregular polymerization of isoprene, it hardly shows any appreciable polymerization activity on α-olefins.

There is accordingly a strong demand for a catalyst system for the polymerization of α-olefins which is capable of producing crystalline polymers in large yields and which has high activity and is furthermore inexpensive.

DESCRIPTION OF THE INVENTION

It is therefore an object of the present invention to provide a process for the preparation of a catalyst system useful in polymerizing α-olefins, which meets all the above requirements simultaneously.

It is another object of the present invention to provide a catalyst system which comprises a heretofore unknown activated titanium component having unique polymerization characteristics.

It is a further object of the invention to provide a method of polymerizing α-olefins which uses an improved activated titanium component in the catalyst system used in the polymerization.

The catalyst system for the polymerization of α-olefins according to the present invention comprises a mixture of an organoaluminum compound and an activated titanium component which latter is obtained by reacting (1) a titanium compound, (2) a metal of Group II or III of the Periodic Table, and (3) a halide of a metal of Group II or III of the Periodic Table, in the presence of aromatic compounds, to obtain a reaction product (hereinlater referred to as complex A), treating the complex A with an oxygen-containing organic compound, further treating with a tetrahalide of titanium, vanadium, or both at a temperature of −80° C. to 80° C., and aging at a temperature above 30° C.

The polymerization of α-olefins in the presence of the catalyst system according to the present invention has been found to proceed at a very high velocity and results in the formation of polymers which have a very reduced amount of fines and a uniform crystalline particle size. In the practice of the invention, the hereabove mentioned pulverizing treatment of the activated titanium component is not necessary, thus reducing production costs of the activated titanium component to a considerable extent.

Aromatic compounds useful in the preparation of complex A according to the invention are aromatic hydrocarbons and halogenated aromatic hydrocarbons such as benzene, toluene, xylene, naphthalene, monochlorobenzene, monochlorotoluene, etc., but are not limited only to these compounds. Hydrocarbon solvents such as aliphatic hydrocarbons, alicyclic hydrocarbons and halogenated hydrocarbons may be used in admixture with the armatic compounds. After the preparation of complex A, these aromatic compounds may be diluted or substituted with any of the hydrocarbon solvents.

The titanium compounds suitable for the preparation of complex A are those expressed by the general formula $$TiX_n(OR)_{4-n}$$

wherein X represents a halogen atom, R represents a hydrocarbon group such as an alkyl group or a phenyl group, and n is an integer of 2 to 4. Representative of the titanium compounds are titanium tetrachloride, titanium tetrabromide, monoethoxytrichlorotitanium, monoethoxytribromotitanium, diphenyldichlorotitanium, etc. These are also usable in admixtures of two or more. Typical of the metals of Group II or III of the Periodic Table are metallic aluminum and magnesium.

The halides of the metals of Group II or III of the Periodic Table are those expressed by $MX_2$ or $M'X_3$ (in which M represents a metal of Group II of the Periodic Table, M' represents a metal of Group III and X is a halogen atom) and include, for example, aluminum trichloride, aluminum tribromide, aluminum triiodide, magnesium chloride, magnesium bromide, magnesium iodide, etc. These may be used singly or in combination of two or more.

The metal of Group II or III of the Periodic Table and the halide of the metal of Group II or III are used in amounts, by mole ratio, of 0.5–50 times, preferably 0.5–20 times, that of the titanium compound, respectively. The aromatic compound serves both as a reactant and as a solvent and generally it is used in an amount by mole ratio of 1–100 times, preferably 20–50 times, that of the titanium compound.

The reaction temperature for the preparation of complex A is generally in the range of 50°–200° C. The reaction time is generally in the range of 5–25 hours, although not critical.

The resulting complex A is then treated with an oxygen-containing organic compound. Representative examples of the oxygen-containing organic compounds are ethers, ketones, esters and the like. Usable ethers are saturated and unsaturated ethers, cyclic ethers and polyethers and include, for example, ethyl ether, n-propyl ether, n-butyl ether, isoamyl ether, benzyl ether, cyclohexyl ether, phenyl ether, methyl phenyl ether, allyl ether, 4-chlorophenyl ether, 2-chlorophenyl ether, tetrahydrofuran, anisole, dioxane, propylene oxide, diethylene glycol dimethyl ether, diethylene glycol dipropyl ether, ethylene glycol diphenyl ether, ethylene glycol ditolyl ether, and the like. Typical ketones are saturated and unsaturated ketones, cyclic ketones, etc., and include, for example, acetone, diethyl ketone, methyl isobutyl ketone, methyl benzyl ketone, acetophenone, diphenyl ketone, cyclohexanone, acetyl acetone, allyl phenyl ketone, p-chlorophenyl methyl ketone, methyl tolyl ketone and the like. Suitable esters are saturated and unsaturated esters, cyclic esters, etc., and include, for example, methyl acetate, methyl acetoacetate, ethyl acetate, butyl acetate, cyclohexyl acetate, benzyl acetate, methyl benzoate, ε-caprolactone, ethyl chloroacetate and the like. Of these, n-propyl ether, n-butyl ether, isoamyl ether, anisole, diethyl ketone and butyl acetate are preferred. The treatment of complex A with the oxygen-containing organic compound may be conducted in the presence of the aromatic compound used in the preparation of complex A, with or without addition of a fresh solvent such as n-heptane, or it may be carried out after first removing the aromatic compound from complex A and freshly adding a solvent such as n-heptane for substitution. The treating temperature is desired to be generally in the range of −50° to 150° C. The reaction time, though not critical, is generally in the range of minutes to 24 hours, during which the reaction mixture is preferably agitated. The amount of the oxygen-containing organic compound is in the range of 0.1–20 moles, preferably 0.5–5 mole, per mole of complex A.

The complex A treated with the oxygen-containing organic compound is then further treated with a tetrahalide of titanium, vanadium, or both in the presence or absence of a solvent such as n-heptane. This treatment may be effected in the presence of the mixture of the oxygen-containing organic compound and solvent, such as n-heptane, from the preceding step, or it may be conducted after substituting the preceding medium with an inert solvent such as n-heptane by separation of the treated complex A from the liquid medium by means of decantation or filtration. The treatment is carried out preferably under agitation at a temperature of −80° to 80° C., preferably −50° to 30° C. Temperatures over 80° C. not only lower the polymerization activity of the resulting catalyst system even if the titanium component is activated by an aging treatment which will be described hereinlater, but also lower the stereoregularity of the polyolefins, produced in the polymerization step. The treating time is generally in the range of 5 minutes to 24 hours, although not critical. The amount of the tetrahalide is in the range of 0.1–20 moles, preferably 0.5–5 moles, per mole of the initially employed complex A.

After completion of the treatment, the titanium component is subjected to aging. The titanium component obtained prior to the aging is brown or blackish brown in color and is found to exhibit almost no activity when employed either directly in or in combination with organoalminum compound in the polymerization of α-olefins. This titanium component can thus not be employed as one prominent component for the polymerization of α-olefins at all.

It is known from Japanese Patent Publication No. 20501/1964 that, when used in a catalyst system, a titanium component which is obtained by reducing titanium tetrachloride by means of an organoaluminum compound and aging, can improve the activity and stereoregularity of the polymerization of olefins. However, the polymerization activity and the ability to impart stereoregularity of the titanium component is still very much insufficient, even if the titanium component is aged.

It has now been found unexpectedly that, when the titanium component of the system prepared according the present invention is aged, it has a tremendously increased activity and ability to impart stereoregularity. The aging temperature in the practice of the invention is required to be above 30° C., preferably in the range of 40° to 150° C. The aging time varies depending on the aging temperature and is generally in the range of 30 minutes to 24 hours, although this is not critical. The aging should be conducted under such conditions of temperature and time, that the titanium component turns from brown or blackish brown to blackish purple. The resulting activated titanium component of the catalyst system may be used in a slurry state or, after removal of the solvent such as n-heptane used prior to the aging, it may be dryed.

The activated titanium component in combination with an organoaluminum compound is now ready for use as a catalyst system for the polymerization of α-olefins.

The organoaluminum compound to be used in combination with the activated titanium component may be any of the known organoaluminum compounds which are generally used as catalysts for polymerization of olefins in admixture with transition metal halides such as titanium trichloride. The catalyst system of the invention may be further added to a known third component of the system, such as practiced in known transition metal halide-organoaluminum compound-third component catalyst systems for the polymerization of olefins.

Preferred organoaluminum compounds in the system of the present invention are those expressed by the general formulae $$AlR_2X \text{ or } AlR_3$$

in which R represents an alkyl group or an aryl group, and X represents a halogen atom. Examples of preferred organoaluminum compounds include diethylaluminum monochloride, triethylaluminum, di-n-propylaluminum monochloride, tri-n-butylaluminum, diisobutylaluminum monochloride, triisobutylaluminum or mixtures thereof.

Apart from the organoaluminum compounds expressed by the above general formulae, other organoaluminum compounds which are used for the polymerization of α-olefins in combination with known activated titanium components may be also used. Examples of such organoaluminum compounds are ethylaluminum dichloride, ethylaluminum sesquichloride, diethylaluminum hydride and the like.

The mole ratio of the organoaluminum compound to the activated titanium component is generally in the range of 1:0.1–1:100, preferably 1:0.5–1:50.

The catalyst system containing the activated titanium component obtained by the method according to the present invention as described hereinbefore in admixture with an organoaluminum compound shows a very high polymerization velocity when employed in the polymerization of α-olefins and yields polymers with high crystallinity.

In accordance with the process of the invention, various kinds of monomers such as ethylene, propylene, butene-1, pentene-1, hexene-1, 4-methylphentene-1 and a mixture thereof may be polymerized or copolymerized. The polymerization reaction can be carried out under conditions generally employed in such polymerization. That is, the polymerization temperature ranges from 20° C. to 200° C., preferably 50° C. to 100° C. and the reaction pressure ranges from atmospheric to 200 atm., preferably to 100 atm. For the polymerization reaction, aliphatic, alicyclic and aromatic hydrocarbons or mixtures thereof may be used as solvent. For example, propane, butane, hexane, heptane, benzene, toluene and the like solvents are preferably employed. In the practice of the invention, α-olefins may be polymerized or copolymerized under substantially solvent-free conditions, e.g., by gas-phase polymerization or by bulk, liquid-phase polymerization. The molecular weight of the polymers obtained according to the process of the invention varies depending on the manner of the reaction, the kind of catalyst system and the polymerization conditions but may be suitably controlled by addition of hydrogen, an alkyl halide, dialkylzinc or the like.

The present invention will be demonstrated by the following Examples, which should not be construed as limitative thereof. In the Examples and Comparative examples, the polymerization activity of the catalysts is indicated by a quantity in weight of polymerized monomer per unit weight of the activated titanium component per hour. All the activated titanium components obtained in the respective Examples of the invention were blackish purple in color.

EXAMPLE 1

(1) Preparation of Complex A 300 ml of benzene, 34 g of titanium tetrachloride, 32 g of aluminum trichloride and 5 g of metallic aluminum powder were charged into a four neck flask of 500 ml volume equipped with an agitator in nitrogen atmosphere. The temperature of the content was gradually increased with agitation until the reaction system began to reflux, followed by maintaining at refluxing temperature for about 15 hours. After completion of the reaction, unreacted aluminum trichloride and metallic aluminum were removed from the reaction system, and the resulting liquid phase (i.e., complex A solution) was introduced into a bottle for the liquid catalyst and stored. The complex A had a concentration of 0.24 g/ml.

(2) Treatment With Oxygen-containing Organic Compound 77 ml of the complex A prepared in above procedure (1) was introduced into a 300 ml four neck distillation flask equipped with an agitator in an atmosphere of nitrogen. 22 ml of n-butyl ether were added to the flask while agitating. After completion of the addition, the temperature of the flask was gradually increased to 35° C., followed by agitating at that temperature for about 1 hour. Thereafter, 50 ml of fresh n-heptane were introduced into the flask.

(3) Treatment with Titanium Tetrachloride

The reaction system of the above procedure (2) was continuously agitated at 35° C. and then cooled to and maintained at 10° C. A mixed solution of 10 ml of titanium tetrachloride and 50 ml of n-heptane was added dropwise over about 30 minutes to produce a precipitate of the titanium component.

(4) Aging

After completion of the dropwise addition of the titanium tetrachloride, the flask was heated to increase the temperature from 10° C. to 65° C. The agitation was continued for 2 more hours. Thus, the aging was completed and the reaction product was washed four times, each time with 100 ml of n-heptane to obtain the activated titanium component.

(5) Polymerization Of Propylene By Use of The Activated Titanium Component Prepared Above 1 l of heptane, 200 mg of the activated titanium component and 0.3 ml of diethylaluminum monochloride were introduced into a SUS-27 autoclave of 2 liter volume in a nitrogen atmosphere. The nitrogen in the autoclave was purged with propylene and then propylene was fed until the pressure reached 0.2 kg/cm$^2$G and then hydrogen was fed until the pressure reached 0.8 kg/cm$^2$G.

The content in the autoclave was heated such that the internal temperature was increased to 70° C. in 5 minutes. The polymerization was continued at 70° C. During the polymerization, propylene was continuously fed so that the pressure of the reaction system was kept at 5 kg/cm$^2$. The feed of propylene was stopped after 2 hours from the start of the polymerization, and the content in the autoclave was quickly cooled down to 25° C. Unreacted propylene was discharged from the autoclave. 290 ml of methanol were added to the content, which was then heated to 90° C. for deactivation of polymerization. After cooling the autoclave, the content was withdrawn from the autoclave, to which 500 ml of heptane were added. Further, 500 ml of water were added to the reaction solution, which was then heated to 60° C. with agitation to wash the polymer, and the liquid phase was separated by decantation. The above procedure was repeated three times, followed by filtering off and drying at 60° C. under reduced pressure to obtain 342 g of white powdery crystalline polypropylene.

The polypropylene obtained had an intrinsic viscosity of 1.64 (the intrinsic viscosity was determined in tetralin solvent at 135° C. and such determination was conducted in the same manner whenever it appears hereinlater), and a bulk density of 0.42 g/ml. Further, the proportion by weight of the polymer which remained after extraction of the white powdery crystalline polypropylene with n-heptane, to the white powdery crystalline polypropylene (hereinlater referred to simply as "n-heptane extraction residue") was 98.1%.

The amount of fines under 200 mesh in the crystalline polypropylene (hereinlater referred to simply as fines content) was as small as 1.6 wt %. That is, 92.9% by weight of the powdery crystalline polypropylene was in the particle size range of 20–48 mesh, thus showing a very sharp distribution in particle size.

Upon evaporating the filtrate, 5 g of amorphous polypropylene were obtained. The total of the produced polymers was thus the sum of the white powdery crystalline polypropylene and the amorphous polypropylene. The proportion by weight of the crystalline polypropylene to the total polymer product (hereinlater referred to as powder yield) was 98.0 wt %. The product of the powder yield and the n-heptane extraction residue, i.e., the proportion of the crystalline polypropylene weight to the total polymer weight (hereinlater referred to simply as I. Index) was 96.1 wt %. The polymerization activity of the catalyst system was 868 g/g.hr.

EXAMPLE 2

Example 1 was repeated to produce complex A except that 150 ml of benzene, 250 ml of n-heptane (solvent), 17 g of titanium tetrachloride, 16 g of aluminum trichloride and 2.5 g of metallic aluminum powder were used instead of 300 ml of benzene, 34 g of titanium tetrachloride, 32 g of aluminum trichloride and 5 g of metallic aluminum powder. 154 g of the complex A obtained in the above-mentioned procedures were charged into a 500 ml four neck distillation flask equipped with an agitator in a nitrogen atmosphere. Then, the activated titanium component was prepared in the same manner as in Example 1. The activated titanium component was used in combination with the organoaluminum compound for polymerizing propylene in the same manner as in Example 1. The experimental results are shown in Table 1.

EXAMPLE 3

Example 1 was repeated except that 25 ml of isoamyl ether were used instead of 22 ml of n-butyl ether and titanium tetrachloride as used in step (3) of Example 1 was employed in an amount of 8 ml instead of 10 ml, thereby polymerizing propylene. The test results are also shown in Table 1.

EXAMPLE 4

Example 1 was repeated using 16 ml of butyl acetate instead of 22 ml of n-butyl ether as the oxygen-containing organic compound, thereby polymerizing propylene, and the test results are given in Table 1.

Comparative Example 1

A titanium component (i.e., beta-titanium trichloride catalyst component) was prepared in accordance with the method described in U.S. Pat. No. 3,492,281. That is, 77 ml of the complex A prepared in Example 1 was introduced into a four neck distillation flask of 300 ml volume equipped with an agitator in an atmosphere of nitrogen. 19 ml of diphenyl ether was dropwise added to the flask under agitation. After completion of the addition, the temperature in the flask was gradually increased to 35° C., followed by agitating at 35° C. for about 1 hour.

Then, the flask was cooled to and maintained at 10° C., to which 10 ml of titanium tetrachloride were dropwise added. After completion of the addition, the cold slurry was subjected to centrifugal separation and separated into a liquid phase and a solid phase in about 5 minutes. After removal of the liquid phase, the solid phase was washed with 100 ml of benzene at 10° C. and the washing was repeated four times to obtain a brown product. Then, Example 1 was repeated using the brown product prepared as above (titanium component) instead of the activated titanium component of Example 1 for polymerizing propylene. The test results are shown in Table 1.

Comparative Example 2

The procedure of Comparative Example 1 was repeated up to the addition of titanium tetrachloride. Then, the flask was heated to 65° C., and 10 ml of titanium tetrachloride were dropwise added. After completion of the addition, the resulting slurry was quickly cooled to 10° C. and subjected to centrifugal separation of the liquid phase and the solid phase. It took about 10 minutes for the cooling and separation. The solid phase thus obtained was washed with 100 ml of benzene at 10° C. and the washing was repeated four times to obtain a brown product (titanium component). Then, Example 1 was repeated using the product thus obtained instead of the activated titanium component of Example 1 for polymerizing propylene. The test results are entered in Table 1.

Comparative Example 3

Comparative Example 1 was repeated using 22 ml of n-butyl ether instead of 19 ml of diphenyl ether as the oxygen-containing organic compound, thereby obtaining a brown product (titanium component). Then, Example 1 was repeated using the brown product thus obtained instead of the activated titanium component of Example 1 for polymerizing propylene, with the test results appearing in Table 1.

After 3 hours from the commencement of the reaction, the feed of ethylene was stopped and the content of the autoclave was rapidly cooled to 25° C. Unreacted ethylene was discharged from the autoclave. Then, 290 ml of methanol were added to the content, which was then heated to and maintained at 90° C. for 30 minutes for deactivation of polymerization. After cooling, the content was withdrawn from the autoclave and added to 500 ml of heptane. Then 500 ml of water were added to the mixture, which was heated to 60° C., and agitated for washing, followed by removal of the aqueous phase from the mixture. The above procedure was repeated Table 1

| Example No. | oxygen-containing organic compound | amount added (ml) | titanium tetrachloride temperature when added (°C.) | amount added (ml) | results of polymerization yield of powdery crystall. polypropylene (g) | yield of amorphous polypropylene (g) | polymerization activity (g/g.hr) | analytical result - for powdery polypropylene n-heptane extraction residue (wt %) | 20–40 mesh particles content (wt %) | fines content (wt %) | I. Index (wt %) |
|---|---|---|---|---|---|---|---|---|---|---|---|
| 1 | n-butyl ether | 22 | 10 | 10 | 342 | 5 | 868 | 98.1 | 92.7 | 1.6 | 96.7 |
| 2 | n-butyl ether | 22 | 10 | 10 | 337 | 5 | 855 | 98.3 | 93.3 | 0.9 | 96.9 |
| 3 | diisoamyl ether | 25 | 10 | 8 | 303 | 4 | 768 | 98.0 | 90.5 | 1.2 | 96.7 |
| 4 | butyl acetate | 16 | 10 | 10 | 286 | 4 | 725 | 98.2 | 91.6 | 0.8 | 96.8 |
| Comp. ex. 1 | diphenyl ether | 19 | 10 | 10 | no activity of polymerization | | | | | | |
| Comp. ex. 2 | diphenyl ether | 19 | 65 | 10 | no activity of polymerization | | | | | | |
| Comp. ex. 3 | n-butyl ether | 22 | 10 | 10 | no activity of polymerization | | | | | | |

EXAMPLE 5

Example 1 was repeated to prepare an activated titanium component except that 4.5 ml of anisole was used as the oxygen-containing organic compound instead of 22 ml of n-butyl ether. The activated titanium component thus prepared was used for the polymerization of ethylene.

1 l of heptane, 100 mg of the activated titanium component and 0.3 ml of triisobutylaluminum were introduced into a SUS-27 autoclave of 2 l volume in a nitrogen atmosphere. The nitrogen in the autoclave was purged with hydrogen and hydrogen was fed under pressure up to 3 kg/cm²G. Then, ethylene was fed to a pressure of 5 kg/cm²G. The content of the autoclave was heated until the internal temperature was increased to 85° C. in 5 minutes, at which temperature the polymerization reaction was continued. During the polymerization, ethylene was continuously fed under pressure while keeping the inner pressure at 8 kg/cm²G.

three times, followed by filtration and drying at 60° C. under reduced pressure to obtain 376 g of white powdery clystalline polyethylene.

The powdery polyethylene thus obtained had an intrinsic viscosity of 1.86, a bulk density of 0.44 g/ml, and a n-heptane extraction residue of 99.3 wt %. The polymerization activity of the catalyst system was 1257 g/g.hr. The powdery polyethylene had a fines (under 200 mesh) content of 0.7 wt %.

EXAMPLE 6

Example 1 was repeated to prepare the activated titanium component except that 13 ml of diethyl ketone were used as the oxygen-containing organic compound instead of 22 ml of n-butyl ether. Then, the polymerization procedure of Example 5 was repeated to polymerize ethylene by use of the activated titanium component thus prepared, with the test results given in Table 2 below.

Table 2

| Examp. Nos. | oxygen-containing organic compound compound | amount added (ml) | titanium tetrachloride temp. when added (°C.) | amount added (ml) | results of polymerization yield of powdery cryst. polyethylene (g) | yield of wax-like polyethylene | polymerization activity (g/g.hr) | analytical results of powdery polyethylene fines content (under 200 mesh wt %) |
|---|---|---|---|---|---|---|---|---|
| 5 | anisole | 4.5 | 10 | 10 | 376 | 1 | 1257 | 0.7 |
| 6 | diethyl ketone | 13 | 10 | 10 | 311 | 1 | 1040 | 0.5 |

EXAMPLES 7-9

Example 1 was repeated using temperatures of −5° C. (Example 7), 30° (Example 8) and 70° C. (Example 9) instead of 10° C. when titanium tetrachloride was added as in the step (3) of Example 1, thereby preparing an activated titanium components. These activated titanium components were employed in the polymerization of propylene in the same manner as in Example 1. The test results are shown in Table 3.

Comparative Example 4

Example 1 was repeated using a temperature of 90° C. instead of 10° C. when titanium tetrachloride was added in a manner as in the step (3) of Example 1, thereby preparing an activated titanium component (blackish brown). Then, propylene was polymerized in the same manner as in Example 1 using the activated titanium component thus prepared, with the test results shown in Table 3.

EXAMPLE 10

Example 1 was repeated using vanadium tetrachloride instead of titanium tetrachloride in step (3) of Example 1, thereby preparing an activated titanium component. Then, Example 5 was repeated using the activated titanium component thus prepared for the polymerization of ethylene, with the test results given in Table 4.

Table 4

| Exam. No. | oxygen-containing organic compound | | vanadium tetrachloride | | results of polymerization | | | analytical results of powdery polyethylene |
|---|---|---|---|---|---|---|---|---|
| | compound | amount added (ml) | temp. when added (°C.) | amount added (ml) | yield of powdery cryst. polyethylene (g) | yield of wax-like polyethylene (g) | activity of polymerization (g/g.hr) | fines content (under 200 mesh) (wt. %) |
| 10 | n-butyl ether | 22 | 10 | 10 | 207 | 1 | 693 | 0.6 |

EXAMPLE 11

Example 1 was repeated except that 300 ml of toluene were used instead of 300 ml of benzene in the preparation of a complex A, thereby preparing the activated titanium component. Thereafter, propylene was polymerized by using the activated titanium component thus prepared in the same manner as in Example 1, with the test results shown in Table 5.

Table 5

| Example No. | oxygen-containing organic compound | | titanium tetrachloride | | results of polymerization | | | analytical results of powdery polypropylene | | I. Index (%) |
|---|---|---|---|---|---|---|---|---|---|---|
| | compound | amount added (ml) | temp. when added (°C.) | amount added (ml) | yield of powdery cryst. polypropylene (g) | yield of amorphous polypropylene (g) | activity of polymerizaton (g/g.hr) | n-heptane extraction residue (wt %) | fines content (under 200 mesh) (wt %) | |
| 11 | n-butyl ether | 22 | 10 | 10 | 231 | 8 | 598 | 96.5 | 2.0 | 93.3 |

EXAMPLE 12-14

Example 1 was repeated using aging temperatures of 25° C. (Example 12), 40° C. (Example 13) and 90° C. (Example 14) instead of 65° C., for preparing three kinds of activated titanium components respectively.

Table 3

| Example No. | oxygen-containing organic compound | | titanium tetrachloride | | results of polymerization | | | analytical results of powdery polypropylene | | I. Index (%) |
|---|---|---|---|---|---|---|---|---|---|---|
| | compound | amount added (ml) | temp. when added (°C.) | amount added (ml) | yield of powdery cryst. polypropylene (g) | yield of amorphous polypropylene | polymerization activity (g/g.hr) | n-heptane extraction residue (wt %) | fines content (under 200 mesh) (wt %) | |
| 7 | n-butyl ether | 22 | −5 | 10 | 353 | 6 | 898 | 98.3 | 1.5 | 96.7 |
| 8 | n-butyl ether | 22 | 30 | 10 | 288 | 4 | 730 | 98.1 | 1.3 | 96.8 |
| 9 | n-butyl ether | 22 | 70 | 10 | 134 | 9 | 358 | 93.5 | 1.1 | 87.6 |
| Comparative Ex. 4 | n-butyl ether | 22 | 90 | 10 | almost no activity of polymerization | | | | | |

Propylene was polymerized in the same manner as in Example 1 using the above three kinds of activated titanium components, respectively, with the test results given in Table 6.

Comparative Example 5

Example 1 was repeated except that the aging was conducted at 10° C. for 5 hours instead of using an aging temperature of 65° C. and an aging time of 2 hours, thereby preparing an activated titanium component (brown). Then, the activated titanium component thus prepared was used for polymerizing propylene in the same manner as in Example 1, with the test results given in Table 6.

formed was gradually heated to 90° C. with agitation and kept at 90° C. while agitating, for 4 hours, five washings at 25° C. each with 100 ml of n-heptane followed. The resulting activated titanium component of purple color is hereinlater referred to as aged titanium component H.

Further, two kinds of activated titanium component were prepared, (methods (C) and (D)) according to the present invention.

Method (C): The procedure of Example 1 up to the aging step was repeated, thereby forming a precipitate of a titanium component. The titanium component thus Table 6

| Example No. | titanium tetrachloride temp. when added (°C.) | titanium tetrachloride amount added (ml) | aging temp. (°C.) | aging time (hr) | results of polymerization yield of powdery crystall. polypropylene (g) | results of polymerization yield of amorphous polypropylene (g) | activity of polymerization (g/g.hr) | analytical results of powdery polypropylene n-heptane extraction residue (wt %) | analytical results of powdery polypropylene fines content (under 200 mesh) (wt %) | I. Index (%) |
|---|---|---|---|---|---|---|---|---|---|---|
| 12 | 10 | 10 | 25 | 2 | 55 | 4 | 148 | 93.8 | 1.5 | 87.4 |
| 13 | 10 | 10 | 40 | 2 | 245 | 4 | 623 | 97.3 | 1.3 | 95.7 |
| 14 | 10 | 10 | 90 | 2 | 350 | 5 | 888 | 98.2 | 0.8 | 96.8 |
| Comp. Ex. 5 | 10 | 10 | 10 | 5 | no polymerization activity | | | | | |

Comparative Examples 6–8 and EXAMPLE 15

In order to prove the effect of aging which is the final step for preparing the activated titanium component according to the invention, two kinds of titanium components were prepared in accordance with methods (A) and (B) described in Examples 1 and 2 of Japanese Patent Publication No. 20501/1964.

Method (A): 30 ml of titanium tetrachloride and 120 ml of n-heptane were introduced into a four neck distillation flask of 500 ml volume equipped with an agitator in a nitrogen atmosphere. The content was cooled to 5° C. while agitating at 150 r.p.m. Thereafter, a solution of 35 ml of diethylaluminum monochloride dissolved in 90 ml of n-heptane were added the flask at a constant rate over a time period of about 4 hours while maintaining the temperature at 5° C. After completion of the addition, the agitation was continued at 5° C. for 2 more hours to complete the reaction. The resulting precipitate of a brown titanium component was washed five times at 25° C., each time with 100 ml of n-heptane, without aging. The titanium component thus obtained is hereinlater referred to as non-aged titanium component H.

Method (B): The procedure of method (A) was repeated up to the washing step, thereby forming a precipitate of the titanium component. The precipitate thus formed was immediately washed five times at 25° C., each time with 100 ml of n-heptane without aging. The resulting brown titanium component is referred to as nonaged titanium component M.

Method (D): The procedure of Example 1 up to the aging step was repeated to form a precipitate of a titanium component. The precipitate thus formed was gradually heated to 90° C. with agitation and kept at 90° C. with stirring for 4 more hours. Thereafter, the titanium component was washed at 25° C. 5 times, each time with 100 ml of n-heptane to obtain a purple activated titanium component which is hereinlater referred to as aged titanium component M.

The above four kinds of the titanium components were used instead of the activated titanium component of Example 1 to polymerize propylene in the same manner as in Example 1. The test results are shown in Table 7.

Table 7

| Comparative Example No. | titanium component | results of polymerization yield of powdery crystall. polypropylene (g) | results of polymerization yield of amorphous polypropylene (g) | polymerization activity (g/g.hr) | analytical results of powdery polypropylene n-heptane extraction residue (wt %) | analytical results of powdery polypropylene fines content (under 200 mesh) (wt %) | I. Index (wt %) |
|---|---|---|---|---|---|---|---|
| 6 | non-aged H | 54 | 10 | 160 | 91.8 | 4.3 | 61.7 |
| 7 | aged H | 79 | 9 | 220 | 93.9 | 1.3 | 83.7 |
| 8 | non-aged M | almost no polymerization activity | | | | | |
| Example 15 | aged M | 352 | 5 | 893 | 98.3 | 1.9 | 96.9 |

EXAMPLE 16

A bulk polymerization of propylene was carried out using the activated titanium component prepared in Example 1. That is, 100 mg of the activated titanium component and 0.3 ml of diethylaluminum monochloride suspended in 30 ml of heptane were charged into a SUS-27 autoclave of 6 l volume in a nitrogen atmosphere. The nitrogen in the autoclave was exhausted by means of a vacuum pump and 2 Nl of hydrogen and 2.5 kg of propylene were then fed into the autoclave. The content of the autoclave was heated until the internal temperature was increased to 60° C. in 10 min, at which temperature the polymerization was conducted. After 5 hours of polymerization, 20 ml of methanol were added and the content was agitated for 10 min. to decompose the catalyst. After cooling the autoclave, the content was withdrawn, and dried at 60° C. under reduced pressure to obtain 1120 g of white powdery crystalline polypropylene.

The white powdery polypropylene thus obtained had an intrinsic viscosity of 2.10, a bulk density of 0.43 g/cc, an I. index of 94.1%. The fines (under 200 mesh) content was 1.5%. The polymerization activity of the catalyst system was found to be 2240 g/g.hr.

What we claim is:

1. A method of preparing an activated titanium component for use in an α-olefin polymerization catalyst system having at least one organo-aluminum compound admixed therein, said method comprising:
   (a) reacting at a temperature in the range of 50°–200° C. and in the presence of an aromatic compound selected from aromatic hydrocarbons and halogenated aromatic hydrocarbons
   (i) a titanium compound having the general formula $TiX_n(OR)_{4-n}$, wherein X is a halogen, R is a hydrocarbon group radical and n is 2 to 4,
   (ii) a metal selected from the class consisting of groups II and III of the Periodic Table and present in the reaction in a molar amount of from 0.5 to 20 times the moles of the titanium compound, and
   (iii) at least one halide of a metal selected from the class consisting of groups II and III of the Periodic Table and present in the reaction in a molar amount of from 0.5 to 20 times the moles of the titanium compound;
   (b) treating the thus obtained reaction product with 0.1–20 moles of an organic compound selected from hydrocarbyl and chlorohydrocarbyl ethers, ketones and esters per mole of product at a temperature in the range of −50° to 150° C.;
   (c) further treating the thus treated reaction product with 0.1–20 moles of a tetrahalide of a metal selected from the group consisting of titanium, vanadium and mixtures thereof, per mole of product at a temperature in the range of −80° to 80° C.; and
   (d) aging the thus further treated reaction product at a temperature greater than 30° C. for a time ranging from 30 minutes to 24 hours.

2. The method according to claim 1, wherein said hydrocarbon group radical of said titanium compound is selected from the group consisting of alkyl and phenyl groups.

3. The method according to claim 1, wherein said metal is selected from the group consisting of aluminum and magnesium.

4. The method according to claim 1, wherein said halide is selected from the group consisting of iodides, bromides and chlorides of a metal selected from the group consisting of aluminum, magnesium and mixtures thereof.

5. The method according to claim 1, wherein said aromatic compound is present in the reaction in a molar amount of from 20 to 50 times the moles of the titanium compound reactant (a).

6. The method according to claim 1, wherein said organic compound is selected from the group consisting of n-propyl ether, n-butyl ether, iso-amyl ether, anisole, diethyl ketone and butyl acetate.

7. The method according to claim 1, wherein said organic compound is employed in a molar amount of 0.5–5 moles per mole of the said obtained reaction product.

8. The method according to claim 1, wherein said further treating with said tetrahalide is effected at a temperature in the range of −50° to 30° C. with a molar amount of tetrahalide in the range of 0.1–20 moles per mole of said obtained reaction product.

9. The method according to claim 1, wherein said aging is effected at temperatures of from 40° to 150° C.

10. A catalyst system for use in the polymerization of α-olefins, which comprises, admixed with at least one organo-aluminum compound, in an amount of from 0.1 to 100 moles per mole of said organo-aluminum compound, an activated titanium component which is the product of the reaction among (i) a titanium compound of the general formula $TiX_n(OR)_{4-n}$, wherein X is a halogen, R is a hydrocarbon group radical and n is 2 to 4, (ii) a metal selected from the class consisting of groups II and III of the Periodic Table and present in the reaction in a molar amount of from 0.5 to 20 times the moles of the titanium compound, and (iii) at least one halide of a metal selected from the class consisting of groups II and III of the Periodic Table and present in the reaction in a molar amount of from 0.5 to 20 times the moles of the titanium compound, said reaction being carried out in the presence of an aromatic compound selected from aromatic hydrocarbons and halogenated aromatic hydrocarbons at a temperature of 50° to 200° C., said reaction product having been treated with 0.1–20 moles of an organic compound selected from hydrocarbyl and chlorohydrocarbyl ethers, ketones and esters per mole of product at a temperature of −50° to 150° C., and further treated with 0.1–20 moles of a tetrahalide of a metal selected from the group consisting of titanium, vanadium and mixtures thereof per mole of product, at a temperature of −80° to 80° C., and subsequently aged at a temperature greater than 30° C. for a time ranging from 30 minutes to 24 hours.

11. The catalyst system according to claim 10, wherein said organo-aluminum compound has a general formula selected from $AlR_2X$ and $AlR_3$, wherein R is selected from the class consisting of alkyl and aryl radicals and X is a halogen.

12. The catalyst system according to claim 10, wherein said hydrocarbon group radical of said titanium compound is selected from the group consisting of alkyl and phenyl groups.

13. The catalyst system according to claim 10, wherein said metal is selected from the group consisting of aluminum and magnesium.

14. The catalyst system according to claim 10, wherein said halide is selected from the group consisting of iodides, bromides and chlorides of a metal selected from the group consisting of aluminum, magnesium and mixtures thereof.

15. The catalyst system according to claim 10, wherein said aromatic compound is present in the reaction in a molar amount of from 20 to 50 times the moles of the titanium compound reactant (a).

16. The catalyst system according to claim 10, wherein said organic compound is selected from the group consisting of n-propyl ether, n-butyl ether, iso-amyl ether, anisole, diethyl ketone and butyl acetate.

17. The catalyst system according to claim 10, wherein said organic compound is employed in a molar amount of 0.5–5 moles per mole of the said obtained reaction product.

18. The catalyst system according to claim 10, wherein said further treating with said tetrahalide is effected at a temperature in the range of −50° to 30° C.

with a molar amount of tetrahalide in the range of 0.1–20 moles per mole of said obtained reaction product.

19. The catalyst system according to claim 10, wherein said aging is effected at temperatures of 40° to 150° C.

* * * * *